US005992704A

United States Patent [19]

Jäger-Waldau

[11] Patent Number: 5,992,704

[45] Date of Patent: Nov. 30, 1999

[54] DISPENSER FOR MEDIA AND METHOD FOR MANUFACTURING A DISCHARGE DEVICE OR THE LIKE

[75] Inventor: Reinhold Jäger-Waldau, Radolfzell, Germany

[73] Assignee: Ing. Erich Pfeiffer GmbH, Radolfzell, Germany

[21] Appl. No.: 08/794,983

[22] Filed: Feb. 5, 1997

[30] Foreign Application Priority Data

Feb. 13, 1996 [DE] Germany .......................... 196 05 153

[51] Int. Cl.$^{6}$ ...................................................... G01F 11/10

[52] U.S. Cl. ....................... 222/341; 222/340; 222/321.1; 222/321.7; 222/321.9

[58] Field of Search .................................... 222/340, 341, 222/321.1, 321.7, 321.9, 385

[56] References Cited

U.S. PATENT DOCUMENTS

| | | | |
|---|---|---|---|
| 3,921,861 | 11/1975 | Kondo | 222/340 |
| 4,147,280 | 4/1979 | Spatz | 222/179.5 |
| 4,155,486 | 5/1979 | Spatz | 222/179.5 |
| 4,191,313 | 3/1980 | Blake et al. | 222/335 |
| 4,371,097 | 2/1983 | O'Neill | 222/321.7 |
| 4,593,607 | 6/1986 | Bennett | 92/130 B |
| 4,762,475 | 8/1988 | Fuchs | 417/550 |
| 5,131,777 | 7/1992 | Kimura et al. | 401/202 |
| 5,211,315 | 5/1993 | Geier | 222/383 |
| 5,341,965 | 8/1994 | Maas et al. | 222/340 |
| 5,518,147 | 5/1996 | Peterson et al. | 222/153.07 |

FOREIGN PATENT DOCUMENTS

| | | |
|---|---|---|
| 0 073 918 A1 | 7/1982 | European Pat. Off. . |
| 0 390 922 A1 | 7/1988 | European Pat. Off. . |
| 0 691 161 A1 | 1/1996 | European Pat. Off. . |
| 35 126 49 A1 | 10/1986 | Germany . |
| 44 11 031 A1 | 1/1995 | Germany . |
| 295 04 817 U1 | 12/1995 | Germany . |

*Primary Examiner*—David J. Walczak
*Assistant Examiner*—Timothy L. Maust
*Attorney, Agent, or Firm*—Quarles & Brady LLP

[57] ABSTRACT

A spiral spring (30) for a discharge device (1) is made of a plastic material with polygonal cross sections (50), and is made integral with at least one dimensionally rigid connecting body (45, 46), such that the spring (30) may also be integrated with further functional parts of the discharge device (1), thereby reducing a number of components in a discharge pump to as few as two components. The components can be produced in integral form in an injection mold before being translated into a working position with respect to each other prior to final removal from the mold.

16 Claims, 6 Drawing Sheets

DISPENSER FOR MEDIA AND METHOD FOR MANUFACTURING A DISCHARGE DEVICE OR THE LIKE

TECHNICAL FIELD

The invention relates to a discharge device with which media in any aggregate condition, for instance, liquid, pasty, gel-like, gaseous, powdery and/or solid media can be dispensed through an orifice, where necessary pressurized, such that they are totally released or liberated from the discharge device at the definition of the discharge orifice. The invention relates also to a method for producing a discharge device or other units or components which more particularly are molded in a negative mold of a plastics material, metal or the like and then removed from the mold by molding release and totally separated from the latter.

DESCRIPTION OF THE BACKGROUND ART

The discharge device comprises two units which for manual actuation of the discharge device are moved against each other with changes in length of the discharge device, e.g. to constrict a pressure space of the discharge device under manual actuating force and thus to subject the more particularly fluid medium contained therein to pressure. In this arrangement the units configured partly or completely integral with each other or formed by components produced separately and then connected to each other. The pressure space is expediently a pumping space of a pump, e.g. of a plunger pump which is defined at its outer circumference and one end of a housing and at the other end by a piston shiftable in the housing as well as, where required, by an inlet valve and/or outlet valve or the like.

Advantageously the discharge device includes a single spring or several springs e.g. a return spring for the return stroke, one or more valves or the like. This spring can be arranged within the pressure space or outside dry and is expediently a coil or sprial spring the longitudinally adjacent winding sections of which are located spaced away from each other in keeping with the spiral pitch.

SUMMARY OF THE INVENTION

The invention is based on the object of defining a discharge device for media in which the disadvantages of known configurations are avoided and which more particularly ensures very simple manufacture for high functional reliability.

In accordance with the invention the spring cross-sections of at least one spring are configured in a departure from being circular over part of their length or over their full length so that over the cross-sectional circumference e.g. sections of differing cross-sectional curvature or more or less linear sections are formed. The spring cross-section may thus be configured partially circular, triangular, square, trapezoidal or the like and extends expediently constantly throughout the full length of the springingly effective spring spiral. The shape or size of the spiral cross-section and/or the spring pitch may, however, also change once or several times over the length of the spring, more particularly with smooth transitions. As a result of this, length sections of the same spring may feature differing spring constants. Advantageously the spring cross-section features at its side facing the spring axis the maximum axial extension which may be equal to or exceed the radial extension of the spring cross-section. As a result of this, irrespective of the spring material, the spring properties, for instance the spring characteristic, the spring force and the response of the spring to changes in temperature can be determined very accurately, and precisely adjusted for a low volume of the spring material.

The spring could consist of a metallic material, for instance, stainless steel or the like, or produced by coiling a wire-like starting material, it is, however, preferable to produce it from a plastic material or as an injection molded part which receives its spring pitch or spring curvature already in the mold. In addition, as a result of this, at one or both ends of the spring spiral dimensionally rigid connecting sections may be molded in place integrally in the same mold which are suitable e.g. as housing, actuating stem, supporting body, valve element, passage body or the like. The corresponding last winding of the spring may adjoin under the spring pitch surface area, such as a face surface area of the connecting body integrally inclined so that none of the adjacent windings of the spring directly adjoin each other by their face surface areas in the relaxed condition. Expediently the two ends of the spring spiral adjoin the two connecting bodies in regions opposing each other diametrically to ensure, where possible, steady loading of the spring.

Over its full outer and/or inner circumference the spring spiral may adjoin a cylindrical or cornered envelope surface area which may also be expanded at least in one axial direction. For example, the spring windings may lie one in the other spirally as viewed axially and thus interengage axially in the relaxed and/or loaded condition so that a very short spring length is possible.

The discharge device having a device unit for securing to a reservoir vessel or reservoir neck may be composed of very few single parts, e.g. two integral single parts in each case. In this arrangement all valves provided may also be configured completely integral with the associated device unit in each case or for each valve a separate valve element may be further provided which is movable with respect to the valve seat of the associated unit.

However, only all outer or convex circumferential surface areas exposed prior to being secured to the reservoir and at least one outer face surface area in each case of the device unit respectively may be configured integrally with each other. In this case further function members, e.g. pistons, valve elements, stems, springs or the like may be arranged in the interior of the device unit in each case as separate components. These are expediently secured exclusively by axial insertion or plugging-in to the associated unit and, where necessary, locked in position or stop-defined axially firmly seated by a press or snap-action connection or the like.

Depending on the intended purpose of the discharge device differingly configured function members may be inserted at will in the base body of each unit integral in each case or, where necessary, forming the stated outer surface areas, e.g. to affect on the one hand a non-atomized discharge of a creamy fluid or on the other an atomized discharge thereof or of some other fluid. This is achieved in particular by passage bodies and nozzle geometries configured differingly which in the first instance comprise smooth nozzle surface areas and in the second instance pitted nozzle surface areas which are expediently defined directly integral by the associated base body of the discharge head.

Expediently the discharge head clasps by its outermost shell or the like the housing base body of the other device unit in the starting position and/or in the actuated end position over part of its length at the outer circumference so that the end of the housing facing the head and open furthest need not be closed off by a separate cover firmly seated thereon, it instead being by engagement in the head screened off, protected and covered therefrom. In this arrangement the head may comprise lengthwise a constant outer width or be offset in width at the outer circumference by a transition shoulder being formed, so that the longitudinal section of the head clasping the housing is wider than the longitudinal section containing the orifice. At least in the actuated end position the housing may, however, also engage the narrower read section.

If the housing unit is to be secured by a cap or the like to the reservoir, then the cap comprises at the inner circumference of its shell expediently a positive-contact member located in the immediate vicinity of the open end of the cap shell, such as a snap-action cam, a protruding thread spiral or the like which surrounds the housing shell. This housing shell may form roughly in the plane of this positive-contact member a face end wall having the shape of an annular disk, e.g. between two housing sections of differing width and thus form a zone stiffened against radial deformation so that even in the case of a minor shell thickness a very high dimensional rigidity is assured.

In accordance with the invention also a method of manufacturing at least two or more components is proposed which are manufactured by injection molding or the like firstly as an integral unit and thereby assuming a first location with respect to each other, namely the production position. Once the first and/or second component has attained a sufficient dimensional rigidity, for example by solidification of the molded material, the two components are translated into a second position with respect to each other, namely their functioning position in which they may be arranged movable or firmly positioned with respect to each other. In this second position the two components are expediently oriented, guided or retained in contact with each other by surface areas which are located spaced away from those surface areas which serve the one with the other in production to join the two components and lie in the material flow by means of which the plastified molding material changes from the mold cavity of the one component into the cavity of the other component. The connecting members formed thereby, which likewise solidify and of which also only a single connecting member may be provided, may remain firmly connected to the first and/or second component during or following transition into the second position. They may also, however, be separated from the first and/or second component by being snapped off, parted or the like and more particularly melted into the respectively component totally enclosed in the mold in subsequent production of the next unit so that they can be disposed of free of any waste.

If the connection contains one or more film-type hinges or flexible joints or intermembers these are arranged expediently in the transition to the second position sunk in recesses or openings of the first and/or second component so that they do not form loop, but instead remain unaccessible as regards to an accidental release of the two components with respect to each other.

The first component may be the first and/or second base body of the discharge device so that the latter consists merely of two units each produced integrally and, nevertheless, having at least three or four parts movable with respect to each other. The second component may be a guiding body for the medium or a body which in the ready-to-use condition of the discharge device is directly in contact with the medium all the time or merely during a discharge cycle or in the resting position. The second component is, in the second position, arranged expediently totally recessed and inaccessible from without within the first component, but may also form one of the outermost surface areas thereof. The second component may be the described spring, a valve element, a nozzle body of the discharge nozzle or any other component of the discharge device.

These and further features are evident not only from the claims but also from the description and the drawings, each of the individual features being achieved by themselves or severally in the form of subcombinations in one embodiment of the invention and in other fields and may represent advantageous aspects as well as being patentable in their own right, for which protection is sought in the present invention. It will be appreciated that dividing the application into separate sections as well as under intermediate headings does not restrict the reading in its validity in general.

BRIEF DESCRIPTION OF THE DRAWINGS

Example embodiments of the invention are explained in more detail in the following and illustrated in the drawings in which.

DETAILED DESCRIPTION OF THE PREFERRED EMBODIMENT

Figure 1:
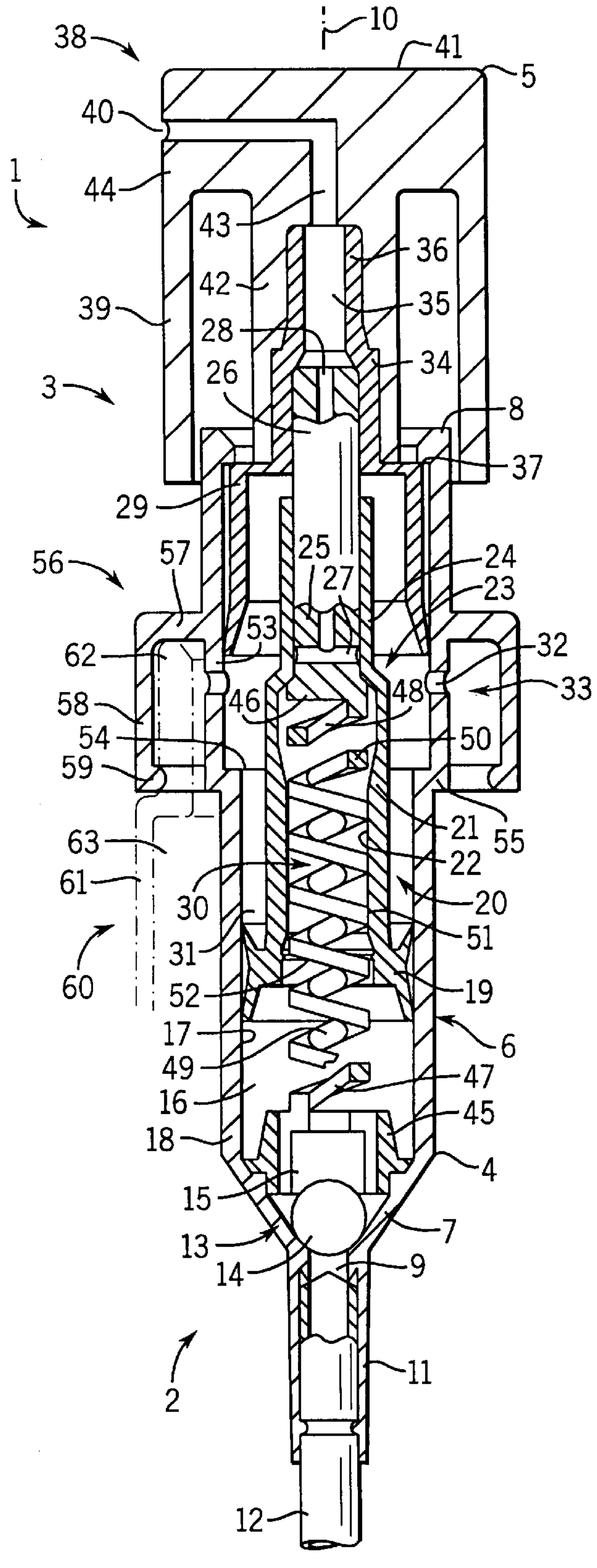
FIG. 1 shows a discharge device in accordance with the invention in axial section and substantially magnified.

All features of the discharge device 1 in accordance with the invention as shown in FIGS. 1 to 11 may be provided in a single discharge device, whereby the latter may include in each case a single or several units or orifices as explained in the following. The device or base units 2, 3 are guided linearly shiftable with respect to each other and each comprises an integral base body 4, 5 freely accessible from without, namely an elongated inner base body 4 and an outer base body 5 shorter with respect to the latter. In the case of a discharge device 1 held upright or vertical and with an outlet at the top, inner has the same meaning as lower and outer the same as upper where relating to the longitudinal direction.

The base body 4 which is tubularly hollow over its full length forms substantially a tubular housing 6 having sections of differing inner and/or outer width and the inner housing end 7 is narrower than the outer housing end 8. The inner end is formed by medium inlet 9 or a closure which on the discharge stroke blocks the medium from flowing out of the inner end and on the return stroke can open to draw new medium into the housing 6 through the inlet 9. Substantially all components of the device 1 lie in a common axis 10. Protruding beyond the end 7 inwards is possibly a port 11 of the base body 4, serving to receive a flexible riser 12, forms the narrowest section of the body 4 or 6 and surrounds firmly seated the outer end section of the riser 12 at the outer circumference. In this case the inlet closure is formed by an inlet valve 13 opening and closing in response to pressure, the globular valve element 14 of which is movingly arranged in a valve body 15 located within the housing 6 radially and axially defined. The conical valve seat is formed directly by the housing 6 and is located at the transition of the latter to the port 11.

The closure 13 which may be configured firmly seated or integral with the housing 6 when the pump is configured non-priming, is located in a pressure space 16 defined by the housing 6, this pressure space extending axially from the closure 13 to a piston 19 located opposite thereto. The latter is arranged slidingly and sealingly shiftable by two conically flared ring lips oriented opposingly and translating directly into each other at the inner circumference or runway 17 of the shell 18 of the housing 6. The piston 19 is a component of a piston unit 20 of the basic unit 3 and is movable stop-limited with respect to the base body 5 in both opposing longitudinal directions. In FIG. 1 the resting or starting position of all components is shown in which the piston 19 is shifted inward with respect to the base body 5. The piston 19 is configured integral with a sleeve-like piston neck 21 protruding beyond the latter outwardly only, the inner circumference of the piston neck defining a passage 22 through which the medium is able to flow from the space 16 outwardly to an outlet valve 23.

The valve 23 or the valve element 24, 25 thereof are arranged on the unit 3. The piston neck 21 is constricted with respect to the piston 19 and comprises spaced away from the piston 19 an end section which, as compared thereto, is further constricted, forming the sleeve-shaped valive element 24 movable with respect to the base body 5 and the valve element 25. The valve element 25 which is firmly seated with respect to the base body 5 is formed by a longitudinal section of a stem 26 passing through the valve element 24, this stem protruding outwards beyond the piston neck 21 and being anchored firmly seated by its outer end in the base body 5. The outer circumference of the valve element 25 forms the valve seat thereof, through which at least one valve opening or a transverse passage 27 passes, this opening being sealed off tight in the closed condition by the valve element 24. If, as compared to this, the valve element 24 is shifted outwards then the valve openings gain access to the flared portion of the piston neck 21 as a result of which they are communicatingly connected as a kind of open slide valve directly to the passage 22 and the pressure space 16. Adjoining the valve openings or the transverse passage 27 outwardly in the axis 10 is a central or longitudinal passage 28 defined, like the transverse passage 27 totally by the stem 26, passing through the outer end of the stem 26.

A further spool or piston 29 is provided which in belonging to the unit 20 is connected firmly seated to the parts 5, 26 and commences stroking prior to the piston 19 in which the piston 19 is included in the movement subsequently following opening of the valve 23. The spool 29 forms one of the two valve elements of a valve 33 for venting the reservoir space in the course of the pumping stroke and seals off the reservoir space in the starting condition outwardly. The spool 29 is pad-shaped having oriented against the piston 19 a pad shell which surrounds the valve element 24 radially spaced away therefrom and slides at the inner end of the pressure space with a piston lip on the inner circumference of the shell 18 flared with respect to the runway 17. One or more openings 32 pass through the shell 18 transversely which on opening of the valve 23 overflow from the piston lip like a spool valve 33, as a result of which they are communicatingly connected along the outer circumference of the spool 29 to the end 8. On the side facing away from the space 16 and spaced away with respect to the piston 29 in common with the shell 18 the piston 19 defines an annular space 31, not subjected to the medium, which is communicatingly connected in the resting position via the openings 32 to the reservoir space and which on closure of the spool valve 33 is completely closed.

Integrally adjoining the annular bottom of the spool 29 and having a substantially lesser width is a hollow spool stem 34, the outer end section 36 of which is further reduced in width incrementally and in which the stem 26 engages firmly seated, the latter being located totally within the base body 5 and defining a flared passage continuation 35 of the passage 28. The outer side of the bottom of the spool 29 abuts against a stop 37 in the spring which protrudes beyond the inner side of the shell 18 as an annular bead at the end 8 and the internal clear width of which is greater than the outer width of the piston 19, but smaller than that of the spool 29 so that the piston 19 can be inserted in the housing 6 like a snap-action member by the stop 37. Located within the spaces 16, 31 and passing through the piston 19 and the neck 21 is a compression spring 30 which is provided as a return spring for the units 2, 3 and for the valves 23, 33.

The unit 3 contains outside of the unit 2 and freely accessible an actuating or discharge head 38 which is formed by the base body 5 and constitutes an extension of the outer end 8 of the body 4 and of the unit 20. The cap-shaped head 38 comprises an outermost shell and at the outer end thereof adjoiningly a face end wall 44, through which the orifice 40 merging to atmosphere passes radially at the outer circumference of the head 38. Radially spaced away within the shell 39, protruding inwardly only from the outer wall 44 is a sleeve-shaped stem 42 of the body 5 in which the stem 26 and the neck 34, 36 are inserted firmly seated and axially defined by a stop. The free end of the stem 42 may abut the outer side of the bottom wall of the spool 29 whilst the free end of the shell 39 in the region of the end 8 closely surrounds the shell 18 at the outer circumference. Provided within the stem 42 is a passage 43 passing through the body 5, this passage forming a constricted elongation of the passage 35 and extending in the face end wall 44 following angle-deflection by a linear leg of the passage directly up to the opening 40 so that the latter is directly defined by the body 5 and requires no separate nozzle body.

The outer face surface area of the body 5, 38 forms a finger press surface area or handle 41, which when pressed enables the unit 3 to be shifted inwards with respect to the unit 2, whereby the bottom surface area of the reservoir vessel 60 (FIG. 1) may be provided as a counterhandle for a further finger of the same hand of the user. The term "finger" in this context is used broadly, so as to include a thumb. The springy longitudinal section of the spring 30 integrally adjoins an inner and an outer connecting body 45, 46 each of which is dimensionally rigid and serves as an abutment for the springy section. The inner body 45 has the shape of a pad or sleeve and is defined with respect to the body 4 under the force of the spring 30 in the region of the valve 13 inwardly oriented by being stopped. For this purpose, on the outer circumference of the body 45 a protruding ring collar is provided which is supported by a ring shoulder of the body 4 protruding inwards beyond the inner circumference. The body 45 defines the housing 15 on the side opposing the valves or valve element of the base body 4 within the space 16 such that the valve element 14 is stopped on its opening movement by the body 45 and centered with radial clearance with respect to the axis 10.

The associated end winding 47 of the spring 30 which is springingly movable with respect to the body 45 integrally adjoins the outer face surface area of the annular bottom of the body 45 under the pitch of the spring which is constant throughout, whereby longitudinal passages may pass through this bottom, the same as the inner circumference of the body 45. As compared to the outer circumference of the spring 30 the body 45 or the bottom thereof features a greater width. The outer end winding 48 adjoins correspondingly the connecting body 46 which is formed by the inner, flared end of the stem 26 or of the valve element 25 and forms a return stop for the piston carrier 21 or the annular transition section to the neck or valve member 24. As a result of this the valve element 24 with the piston 19 is movingly axially defined between the latter and a further stop formed by the inner side of the bottom of the spool 29 so that when stopped by the body 46 the valve 23 is closed and when stopped by the spool 29 the valve 23 is open. The friction of the piston 19 with respect to the body 4 is selected so high that the piston 19 on the first portion of a pumping stroke is halted with respect to the body 4 and is not coupled into the movement until the valves 23, 33 have been opened by the spool 29 being stopped by the end surface area of the valve element 24. From the valve 23 up to the opening 40 the passages 27, 28, 35, 43 are free of any valves.

The spiral of the spring 30 comprises polygonal spring cross-sections 50 which at the inner circumference 49 have the same or greater axial extension as at the outer circumference 51. The inner flank 49 of the cross-section 50 lies, like the outer flank 51 parallel to axis 10 throughout, whilst the side or radial flanks 52 connecting these flanks 49, 51 converge symmetrically outwards and are spaced from each other by a spacing which is the same as or smaller than the flanks 49, 51 from each other. Each of the flanks may be linear and for production of the spring it is expedient when the bottom of the body 45 has an inner width which is at least as large as that of the circumference 49. The spiral of the spring 30 is produced expediently as a shape which, as compared to the starting position is extended, i.e. with a greater pitch so that it is axial preloaded in the starting position. The outer circumference 51 is able to slide on the inner circumference 22 so that each of the parts 21, 20 supports the other radially.

The runway 53 for the valve lip of the valve 33 ends in a stop 54 formed by a ring shoulder of the inner circumference or a wall section 55 of the shell 18 which with respect to the adjoining shell sections is thicker radially. At the end of the pumping stroke the spool 29 comes up against the stop 54 without the piston 19 needing to be stopped by its inner lip or the like when the body 45 engages the pad-shaped opening of the piston 19 so that the piston lip thereof is protected from being crushed.

In the region of the space 31 or of the runway 53 adjoining the outer circumference of the shell 18 is the face end wall 57, in the shape of a ring disk, of a cap-shaped actuating member 56 of the base body 4. The shell 58 of the member 56 protrudes beyond the face end wall 57 inwardly only, the latter being located spaced away from the end 8. At the inner circumference and at the free end of the shell 58 an engaging member, such as an annular cam 59, a spiral thread or the like is provided. The fastening member 56 serves to secure the discharge device 1 to a bottle-shaped reservoir 60 so that the inner end of the unit 2, 4 protrudes into the reservoir space 63, the fastening member 56 surrounding the reservoir neck 62, constricted with respect to the reservoir barrel 61, at the outer circumference, the cam 59 engages a connecting member at the transition between reservoir barrel 61 and reservoir neck 62 and the face end wall 57 contacts the end surface area of the reservoir neck 62 axially pre-loaded as the reservoir seal. As a result of this the opening 32 located radially spaced away within the neck 62 is always communicatingly connected to the reservoir space 63. Projecting beyond the outer side of the face end wall 57 is the shell 18, it extending into the head 38. The cam 59 lies in the same diametrical plane as that of the section 55 which forms a substantial stiffening of the shell 18, similar to the stiffening of the shell 58 by the cam 59 which is a radial springing snap-action member for snap-action connection with the reservoir 60.

For assembling the pump first the integral unit 25, 26, 30, 45, 46 is inserted, from the piston 19 oriented outwardly, into the integral unit 19, 21, 24. When assembling in the upside-down position the valve element 14 can be inserted centered in the permable cage body 45, after which the resulting assembly unit is inserted past the cam or stop 37 through the end 8 into the housing 6. Either before or thereafter the integral unit 29, 34, 36 or the integral unit 39, 42, 44 can also be connected in the same direction as the passage body 19, 21 to the stem 26 or 36 respectively simply by being joined together axially. The cam 37 forms together with the spool 29 also a radially springing snap-action connection by means of which the unit 20 is safeguarded against being pulled out of the unit 2.

Depressing the handle 41 firstly opens the valves 23, 33 simultaneously with the piston 19 fixed in place, after which the latter is included in the movement by the stop and the space 16 constricted and the medium contained therein subjected to pressure, as a result of which the valve 13 is maintained closed. When subjected to this pressure the medium flows from the space 16 through the piston 19, the neck 21 and the spring 30 one after the other into the passages 27, 28, 35, 43 and thus emerges from the opening 40 into the atmosphere. At the same time atmospheric air flows through the inner end of the head 38, the end of the housing 6 and the openings 32 into the reservoir space 63 to compensate the amount of medium taken from this space 16 and to prevent a vacuum from resulting in the space 63. On release of the handle 41 the spring 30 first urges the valve element 25 into the closed position, the body 46 into the stopped position and the spool 29 with respect to the piston body 19 into the starting position, as a result of which the piston body together with these parts is returned to the resting position. This results in the space 16 being again expanded, the valve 13 opening due to the vacuum in the space 16 and the next dose of the medium is drawn in from the bottom region of the reservoir space 63 into the space 16 via the passage parts 11, 12, this dose being discharged in the-way as described on the next possible pumping stroke following immediately.

Figure 2:
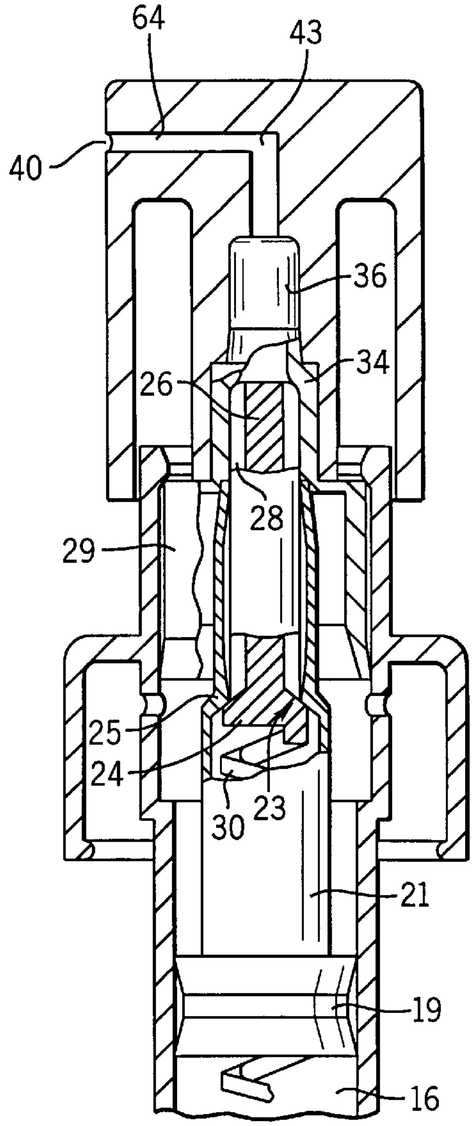
FIG. 2 is a modified embodiment of FIG. 1.

The embodiment of FIG. 1 is suitable in particular for discharging a line of a creamy or liquid medium from the opening 40 without spraying or atomization, this being possible to advantage with the embodiment of FIG. 2. In this case the stem 26 does not—as according to the arrangement shown in FIG. 1—solely define the passage 28, but instead in common with additional members, namely with the outer end sections of the neck 21 and adjoining thereto with the stem 34. Several passages 28 may be provided on the outer circumference of the stem 26 in the form of longitudinal grooves extending up to the valve seat of the valve 23. The closing surface areas of this valve 23 come into contact with each other axially in the closing position, the valve element 24 being formed by a ring lip at the inner circumference of the neck 21 and the valve seat by an annular shell of the valve element 25 which simultaneously forms the connecting body of the members 30. The outer end sections of the neck 21 adjoining the valve element 24 is axially compressible by flaring elastically and is inserted sealed, stop-defined and centered by its outer end into an opening surrounding the stem 26 in the bottom of the spool 29.

Accordingly the valve 23 does not open as a function of travel, as shown in FIG. 1, but as a function of pressure once a predetermined pressure in the space 16 against the force of the cited valve or compression spring is exceeded, so that the medium is already subjected to a high pressure before streaming into the passage 28. The inner circumference of the leg of the passage 43 coaxial to the opening may be provided up to opening 40 with contours 64, for instance longitudinal or spiral grooves distributed about the circumference, through which the flowing medium is swirled and/or subjected to a circular flow about the nozzle axis at right angles to the axis 10 so that it is released atomized at the definition of the opening 40 in forming a spray cone.

Figure 3:
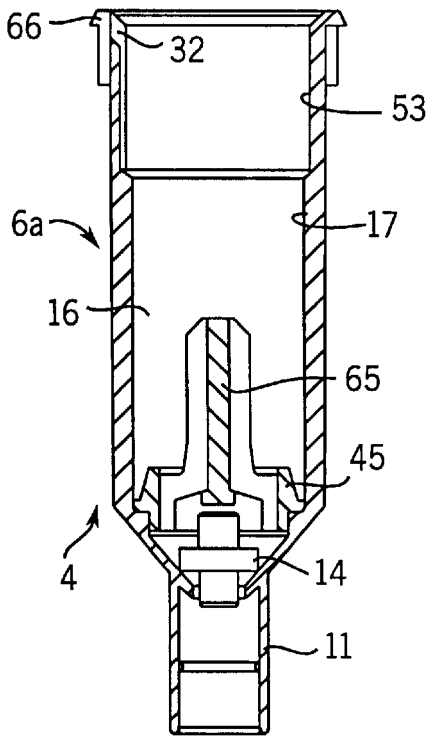
FIG. 3 shows a housing part at the inlet end in axial section.
Figure 4:
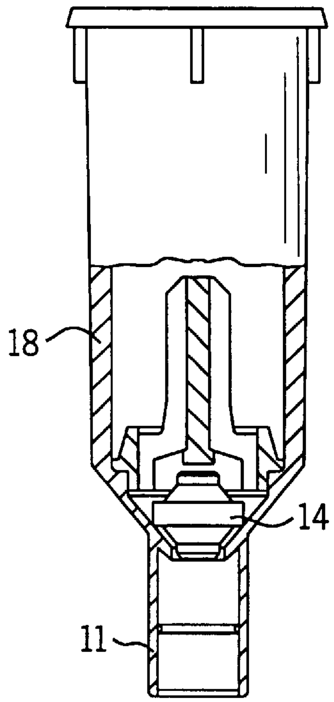
FIGS. 4 and 5 are two further embodiments of housing parts as shown in FIG. 3.
Figure 5:
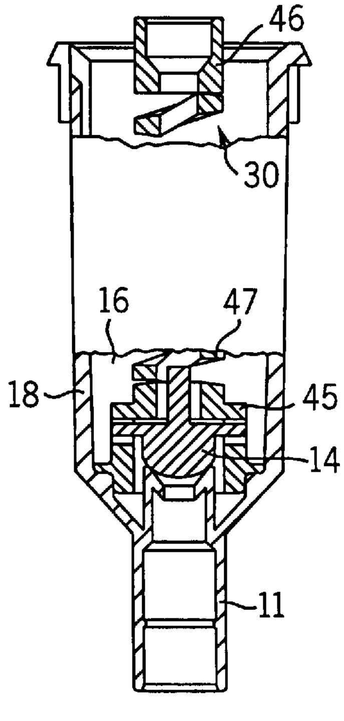

In accordance with FIGS. 3 to 5 a housing body **6*a* separate from the outer end 8 or from the fastening member 56 is provided which defines the space 16, forms the port 11 and the valve seat of the valve 13 and which is to be secured firmly seated by a fastener or snap-action member 66 located at its outer end to a further housing body which contains the end 8 or the fastening member 56. The opening 32 may pass though the member 66, this opening starting from a longitudinal groove on the inner circumference 53. In this case the body 45 is configured separate from the spring unit and comprises a mounting member 65, for instance a freely protruding arbor for engaging the inner circumference 49. The inner end of this arbor 65 serves as a stop for the opening position of the valve element 14 which is not configured globular but as an elongated body having a separate stem and a closing collar in contact with the valve seat. In every valve position the inner end of the stem is located centered in an opening of the base body 4 adjoining the port 11 whilst the outer end of the stem is provided to contact the arbor 65. The arbor 65** is provided with longitudinal grooves for the passage of the medium.

The stem of the valve element 14 as shown in FIG. 4 is not cylindrical throughout, it instead being conical in each case in adjoining the closing collar and thereby being adapted to the inner circumference of the conical transition shoulder between the shell 18 and the port 11.

As evident from FIG. 5 the stem of the valve element 14 passes through the housing body 45 into the space 16 up to and into the winding 47. The valve element 14 stands off inwardly from a plate having the shape of a ring disk, from which the stem protrudes outwardly, whereby for assembly the integral valve element thus formed thereby can be inserted transversely or radially into the body 45 correspondingly open an outer circumference. Into the space 16, as an elongation of the port 11 into the housing 6, a sleeve-shaped protrusion projects freely forward which forms the conical valve seat for the valve element 14, configured integrally with the shell 18 and always protruding into the body 45. The connecting body 46 in this situation is a sleeve-shaped component separate from the stem 26, this component forming a connecting member for plug-in connection with the stem 26 and with the valve element 25 respectively.

Figure 6:
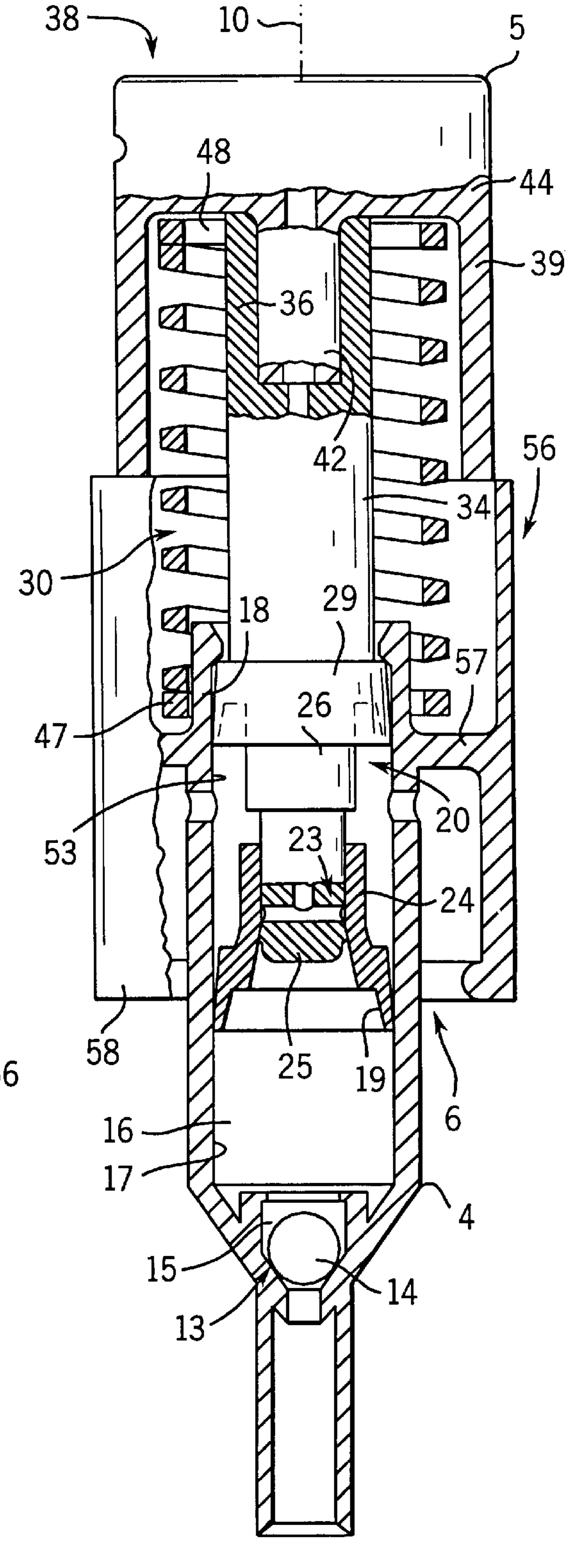
FIG. 6 shows a further discharge device in axial section.

FIG. 6 shows that the section 36 of the stem 34 receives the head stem 42 internally so that it is able to come into contact with the inner side of the face end wall 44. Protruding beyond the inner end of the spool 29 and configured integrally therewith is the stem 26 which forms the valve element 25 by an end section reduced in width so that the piston neck or the valve element 24 is always located axially spaced away from the spool 29 and the opening stop for the valve element 24 is formed by an annular shoulder of the stem 26. As a result of this the piston body 19 can thus be configured substantially shorter than as shown in FIGS. 1 and 2 of a material which is more elastically compressible than that of the spool component 29. In this arrangement the valve body or the cage 15 including the opening stop is configured totally integral with the base body 4 and the housing 6 or **6*a* respectively and the dimensionally rigid valve element 14** can be inserted into the cage space through the radially springingly expandable opening stop as a kind of snap-action connection.

The spring 30 is arranged totally outside of the space 16 or the housing 6 about the shell 18, the piston unit 20 or the members 26, 29, 34, 36, 42 and is supported by the one end winding 47 at the fastening member 56 and by the other end winding 48 at the body 5, 38. This support is provided expediently at the outer side of the face end wall 57 and at the inner side of the face end wall 44, the spring 30 nevertheless being totally covered in every position of the discharge device 1 at the circumference and its its ends outwardly, namely by the shell 39 and a sheli of the fastening member 56 which in an elongation of the shell 58 protrudes beyond the outer side of the face end wall 57 and surrounding the shell 18 with a greater spacing as well as the shell 39 in a closer arrangement. In this case too, the spring 30 could be produced as a wound spring of a length of plastics material which during winding is slightly softened by being heated up and thus ensuring after becoming colder and hardening a very high spring force. The end winding 47 and 48 respectively may lie in a plane at right angles to the axis 10 or parallel to the face end wall 57, 44 and thus be supported by this wall over its entire circumference.

Figure 7:
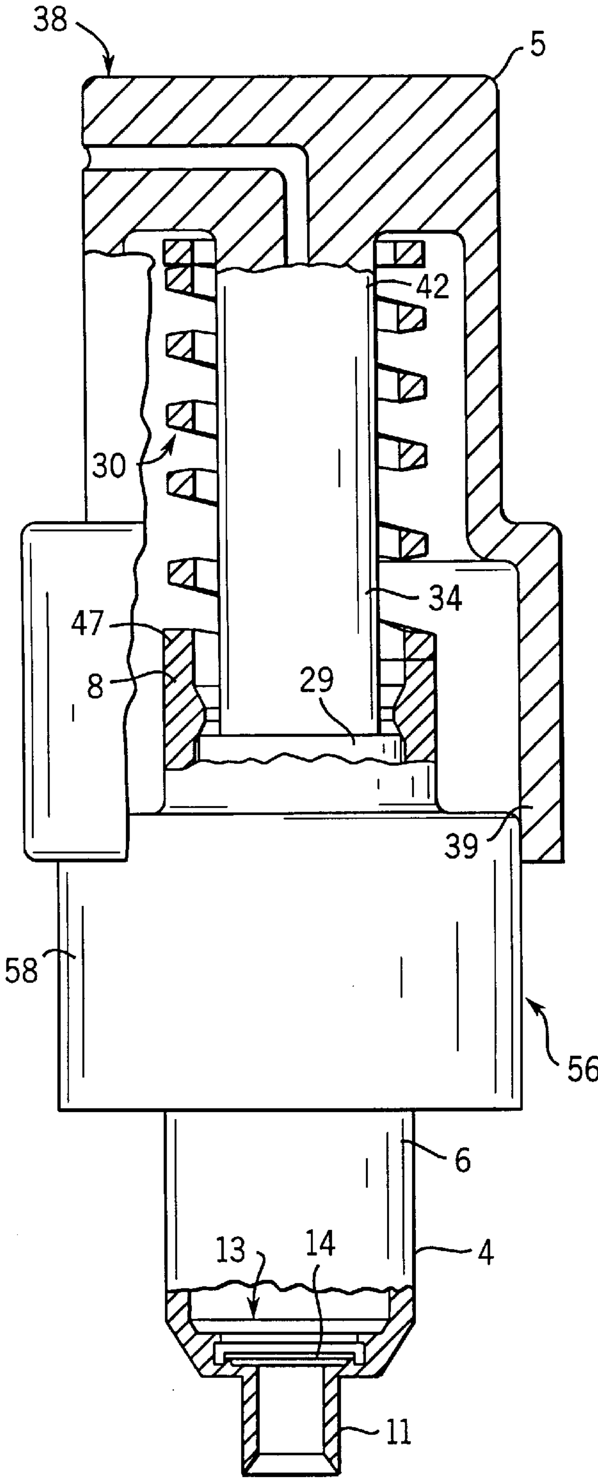
FIG. 7 is a modified embodiment of FIG. 6.

A similar situation applies also to the end winding 47 as shown in FIG. 7, which in this case, however, integrally adjoins the end 8 of the base body 4, 6, and has the same inner width and outer width as this end 8. The stems 42, 34 are, in this case, configured integral with each other as well as with the spool 29 so that, including the valve element 25 they belong to the base body 5. The valve 23 may be configured as shown in FIG. 6. The inner end section of the shell 39 is with respect to the outer end section adjoining the face end wall 44 widened in its inner and/or outer width and tightly clasps in each position the outer circumference of the fastening member 56. The runways 17, 53 may also have the same width and smoothly translate into each other. The valve 13 as shown in FIG. 7 is a plate valve which will now be described in more detail with respect to FIG. 8 and FIG. 10.

Figure 8:
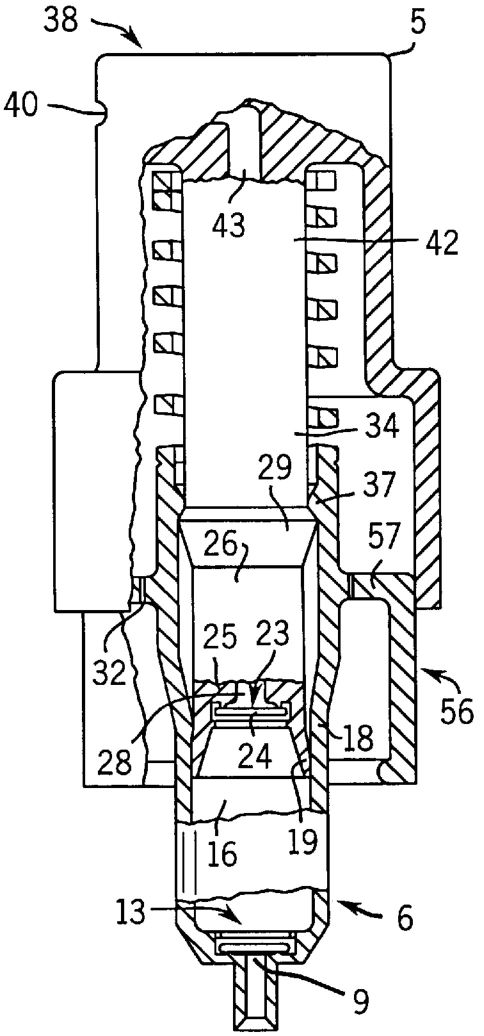
FIG. 8 shows a discharge device of only two main parts.

As evident from FIG. 8 also the piston 19 is configured integrally with the stem 26, 34, 42 and the body 5, 38 as well as with the valve element 25 and the spool 29, the latter not being required in this case to run sealed on the inner circumference of the shell 18, it instead serves more particularly as a closure of the outer end of the housing interior and as a counter stop for the stop 37, it thereby protrudes beyond the outer circumference of the stem 6, 34 by circumference surface areas translating into each other conversely conically. The opening 32 passes through the fastening member 56 or the face end wall 57 thereof directly adjacent to the outer circumference of the shell 18 so that the reservoir space can also be vented via the capillary-tight openings 32. The medium passage in this arrangement is defined integrally from the pressure space 16 or valves of the valve element 25 up to the opening 40 so that the passage sections 22, 27, 28, 35, 43 as shown in FIG. 1 can be formed by an integral component.

Figure 9:
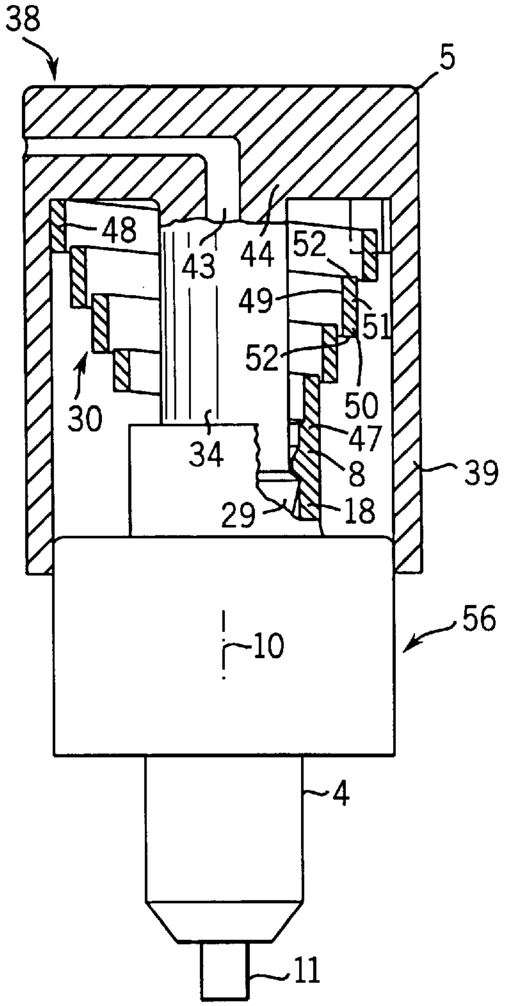
FIG. 9 is a modified aspect of FIG. 8.

As shown in FIG. 9 spring cross-sections 50 are elongated transversely to the longitudinal extent as shown in FIG. 1 or parallel to the axis 10 as well as being rectangular and at least two or three times greater than their thickness so that the spring spirals form a flat tape and have cross-sections 50 which are constant or vary over the length of the spring 30. The spring cross-sections may also be greater radially than axially or the same. In the axial direction the spring 30 has a single conical flare, namely towards the end winding 48, whilst the smallest winding 47 integrally adjoins the end 8 and may have roughly the same thickness as the shell 18. Each smaller spiral engages over its full circumference, closely adapted and without contact the integral of the next larger spiral, i.e. in the spring by a degree which is smaller than the axial extension of the spring cross-section 50 or is the half or a third thereof. The winding 48 is located on an angle of curvature of at least 180° with no pitch at right angles to the axis 10 and is supported on the inner side of the face end wall 44. The spring 30 is configured qeparate from the body 5, 38 and the winding 48 may be supported with flaring tension by its outer circumference on the inner circumference of the shell 39 free of radial clearance. The shell 39 has a constant inner and/or outer width throughout and the spring 30 lies totally within the body 5, 38 as evident from the FIGS. 7 and 8.

Figure 10:
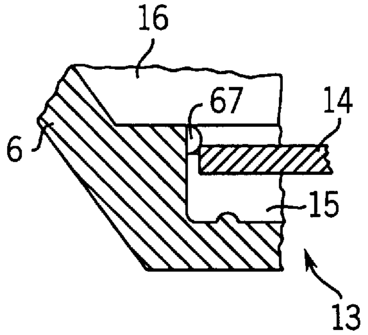
FIG. 10 shows the inlet valve of the embodiment shown in FIG. 8

The valve body 15 of the valve 13 formed integrally by the housing 6 comprises a plate or film-shaped, flexible and/or compressive valve element 14 of constant thickness which, for example, may be formed by an elastomer or thermoplastic material and is located in the cage with minor radial clearance. This cage is formed by a recess on the inner side of the bottom of the housing 6 through which the inlet 9 passes. In the inner closing position the valve element 14 adjoins by its plate side an annular closed bead projection of the bottom surface area of the recess 15. In the region of the opening of the recess 15, projecting beyond the inner circumference thereof,is a stop 67 correspondingly bead-shaped which is, however, passed through by medium passages and is thus subdivided into discrete cams about the circumference. Adjoining this stop 67, likewise partly circular in cross-section, is the valve element 14 in the outer opened position as shown in FIG. 10 by the other plate side and/or the transition edge of the edge surface area, the through-passages in the stop 67 remaining open to allow the medium to flow between this edge surface area and the inner circumference of the recess 15 into the space 16.

Figure 11:
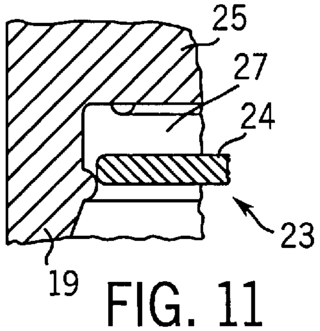
FIG. 11 shows the outlet valve of the embodiment shown in FIG. 8

The outlet valve 23 arranged within the body of the piston 19 directly connecting the passage 28 comprises a valve element 24 arranged suitably as shown in FIG. 11 in a cage or a recess of the piston crown which may have the properties as described with reference to FIG. 10 or formed by a like component as the valve element 14. In the outer opening the valve element 24 locates the bead protrusion of the body of the recess 27 directly adjoining the conical piston lip, in this case the passages being provided in this base body. In the opening position, offset inwards as compared to the latter, the valve element 24 adjoins as described with reference to the stop 67, but sealed, the annular bead protruding beyond the inner circumference which like the definition of the recess 27 is configured integrally with the piston 19, it comprising, however, only a single piston lip oriented inwardly.

The riser may also be formed directly by the port 11 and thus configured integrally with the base body 4, so that a separate riser as shown in FIG. 1 is not necessary. The valve element 14 too, could also be configured integral with the body 4, 6 and the valve element 24 integral with the body 19, 25 as well as being connected, where necessary, with the body belonging in each case via a film-type hinge or the like. In the resting position or spring the spaces 16, 22, 31, 32, 63 may be closed off from the outer atmosphere pressure-tight by the valve configurations as described.

Figure 12:
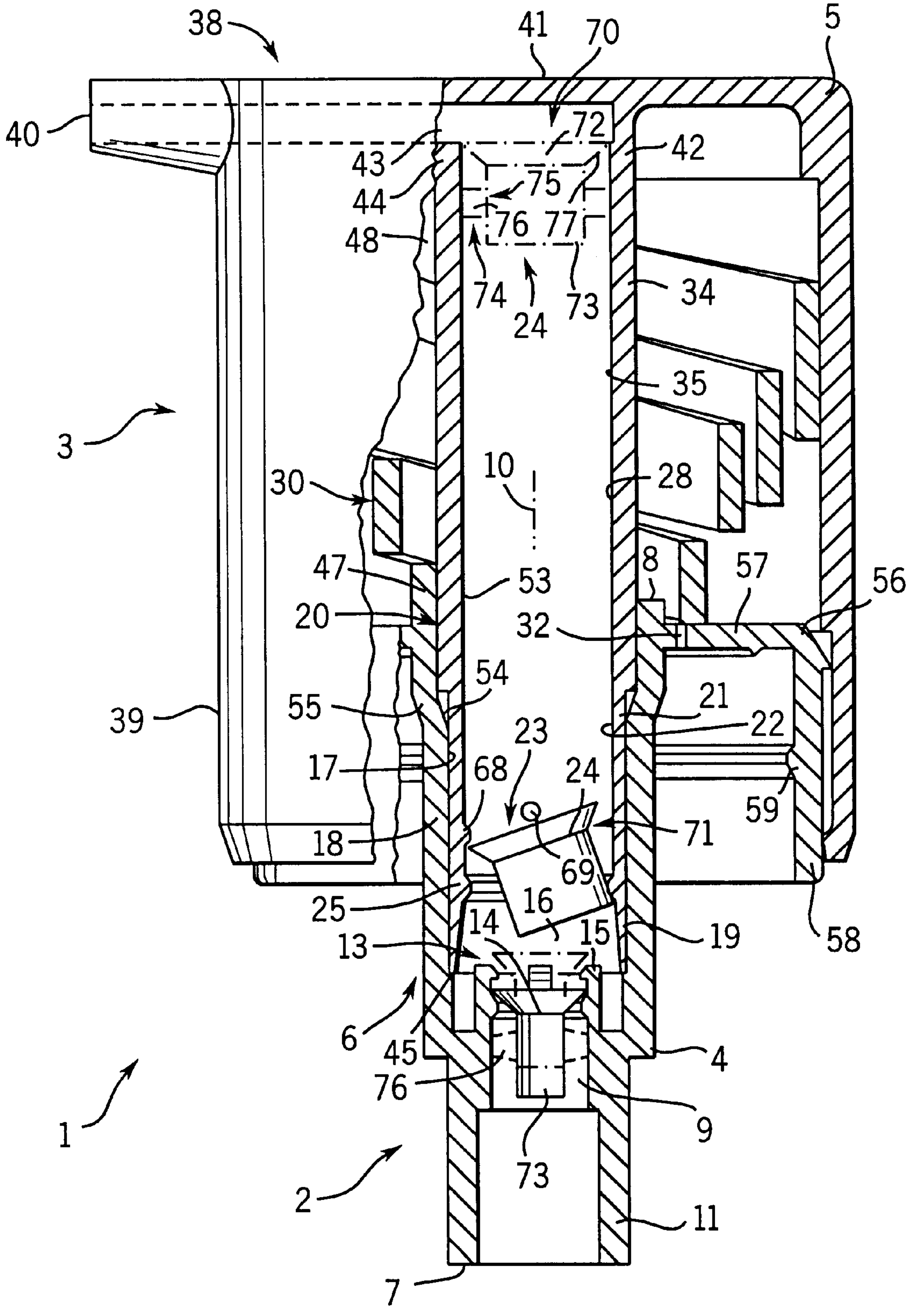
FIG. 12 shows a further embodiment of a discharge device in axial section.

As evident from FIG. 12 the piston 19 is configured integrally with the stem sections 21, 34, 42 so that these parts form a tube which has a constant inner cross-section over the major part of its length. The valve element 24 forms a component which is produced integrally with each of these stem sections or the component 5, i.e. in the first location 70 indicated dot-dashed which differs from the second position, namely the functioning position 71 in the region of the valve element 25. In the position 70 the component 24 is offset axiaally by the multiple of its length and/or its largest width with respect to the position 71 along the stem, namely from its closing position by a multiple of its opening travel beyond the opening position. The component 24 comprises a stem 73 having outer cross-sections constant throughout and at one end of the stem 73 a flared head 72 in the form of a truncated cone, the slanting circumferential surface area of which forms the closing surface area 77 by which the valve element 24 in the closing position adjoins the closing surface area of the valve element 25.

In the position 70 the end surface area of the integral component 24 or head 72 is a tangent to an inner cavity of the component 5, namely the radial section of the passage 43 so that the widest outer circumference of the component 24 formed by the head 72 adjoins via the circumference continuously and directly the inner circumference of a further inner cavity, namely the passage 35. The outer circumference of the section 73 is, as a result of this, radially spaced away from the inner circumference 35. A production molding tool to be extracted through the free end of the piston 19, after production, serves to shape both the inner circumference of the piston 19, the valve element 25 and the tube as well as to shape the complete outer circumference of the component 24 and the end surface area thereof facing the piston 19, formed by the stem 73. This tool comprises in accordance with the invention for forming the outer circumference including the surface area 77 and the inner circumference of the tube, a sleeve as well as within the latter, shiftable therein for forming the end surface area, a core, both of these tool parts being shiftable with respect to each other. Through-openings for the material pass through the wall of the sleeve, distributed about the circumference, each of which is defined circumferentially throughout. Further tool components of the production mold serve to simultaneously finish-mold all remaining regions of the unit 5, 24.

The material for producing the unit 5, 24 is injected in flowable condition into all mold cavities conductingly connected to each other under pressure and at elevated temperature so that at the same time both components 5, 24 as well as a connection 74 between these two components 5, 24 is produced. The connection 74 is formed by the connecting members 76 which are formed by the through-openings in the sleeve-shaped single tool and connecting the outer circumference of the stem 73 initially integrally to the inner circumference of the tube 19, 21, 34, 42 axially spaced away from the working and function surface area 77. Such a hair-fine connection may also be provided in the region of the largest outer circumference of the component 24. Once both components 5, 24 have solidified dimensionally rigid by cooling, the tool is extracted from the piston 19 axially away from the handle 41 inwardly, the regions of the connections 74 adjoining the component 5 and the inner circumference 35 respectively are separated by shear action like design breaking points. At the same time the component 24 is translated from the position 70 in the direction of the position 71. Once the component 24 has attained this position, where necessary by overcoming a spring obstacle, the two tool parts are moved axially one against the other so that the connections 74, 76 are also separated from component 24 by shear action or the like, they then remaining, however, in the through openings of the tool. The tool is then withdrawn totally from the unit 5, 24, namely from the free end of the piston 19 which, here, is depicted in the actuated end position. For translating from position 70 to position 71 the tool may also feature extensible retaining claws for holding the component 24. The connecting zone 75 defined by the lands or pins 76 lies exclusively in the region of the section 73 so that the surface area 77 cannot be damaged when parting the connecting 74.

For the immediate subsequent production of the next unit 5, 24 the connecting members 76 of the unit produced previously can remain in the tool or its through openings. On introduction of the next charge of plasticized material these connecting members 76 are then ejected radially inwards into the cavity serving to mold the component 24, injection being affected exclusively by the subsequent flow of material under pressure which flows into the cavity and thereby plasticizes the ejected connecting members 76 by heat exchange and embeds them totally recessed in the component 24 so that the connecting members 76 then form a proportion of the material volume of the component 24 and new connecting members 76 are formed for the component 24 in production.

The closing surface area of the valve element 25 circumferentially smooth throughout is formed by an annular inner body in the tube or piston 19. In the direction of flow, offset with respect to this closing surface area, stops 68, 69 are provided on the inner circumference of the tube protruding so that, as a kind of spring snap-action connection, where necessary with pliant flaring of the tube, they allow the component 24, particularly the head 72, to be guided past them when the latter is translated into the position 71. The stops 68, 69 are cams distributed over the circumference and located spaced away from each other which are located opposite, spaced away from the closing surface area of the valve element 25 and on which the valve element 24 abuts in the opening position. In this arrangement the valve element 24 may assume an inclined position with respect to the axis 10 so that it executes in its function movements not only an axial movement but also a pivot movement.

In a similar way the valve element 14 of the inlet valve 13 is also produced integrally with the component or base body 4 and then translated from the dot-dashed position into the functioning position. As regards to the valve element 14 like reference numerals are used is for the valve element 24 of the outlet valve 23 so that the corresponding passages of the description apply accordingly also for the production of the unit 4, 14. In this case, however, the travel between the two positions is smaller than the axial length or the greatest outer width of the component 14. The head of the component 14 lies in the first position outside of the valve body 15 and is then snapped into place therein so as to be locked in the second position movable between two end locations. In this case the valve body 15 configured integrally with the component 4 is formed by protrusions distributed about the circumference which also form the stops for the movement clearance of the valve element 14. The connecting members 76 are, in this arrangement, like the associated through openings of the tool conically flared in the ejection direction so that they can be ejected very easily. These members 76 also adjoin the inner circumference 9 of the housing 6 in production.

Figure 13:
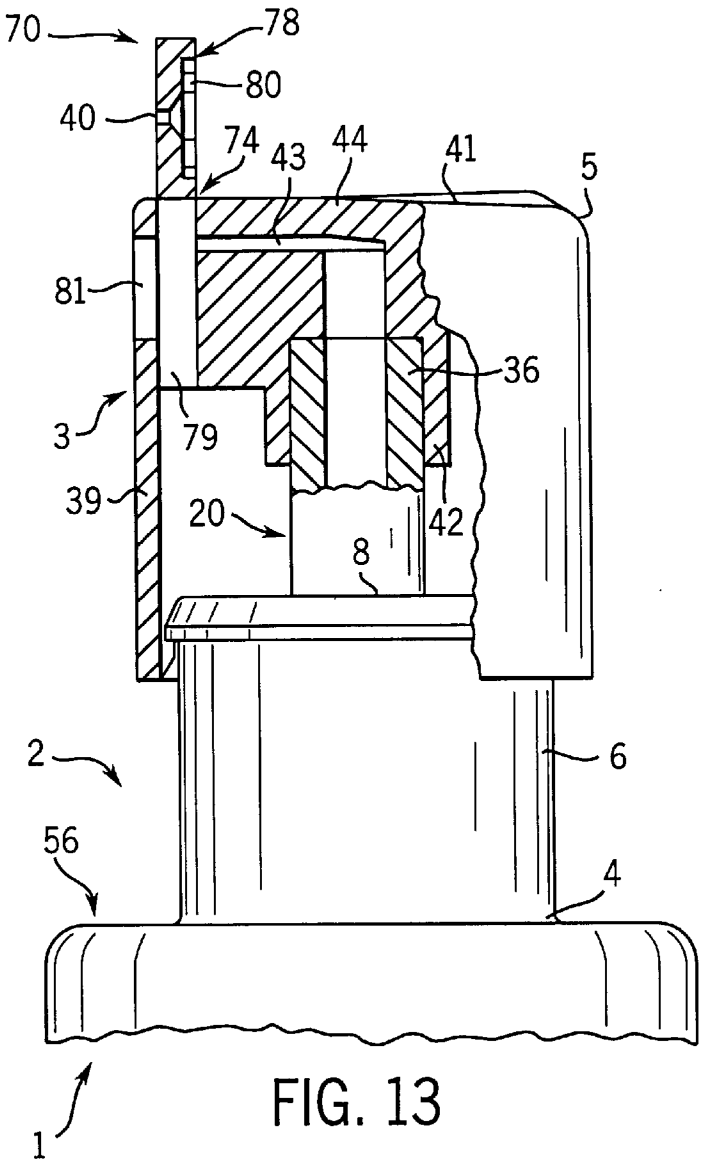
FIG. 13 shows a further embodiment in axial section.
Figure 14:
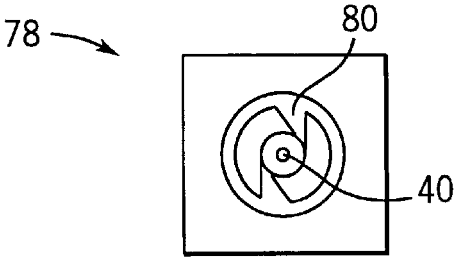
FIG. 14 is a detail of FIG., 13 in axial section.

As evident from the FIGS. 13 and 14 the second component is a guiding or nozzle body 78 for the medium, which either forms the orifice 40 directly or is located upstream directly juxtaposing the nozzle orifice. In the production position 70, shown alone in this case, the body 78 protrudes more or less completely beyond the outer side of the component 5, namely the face surface area 41 and adjoins the wall 44 in forming the connecting 74 to an edge surface area. In this arrangement the component 78 is located in the direct elongation of a mount 79 closely adapted thereto or of a pocket or shaft-shaped opening which as a through opening passes through both face surface areas of the wall 44 and is defined about its circumference throughout by the component 5. On one side of the mount 79 the radial leg of the passage 43 adjoins, whilst the opposite definition is passed through by a through passage 1 which is substantially wider than the orifice 40.

The plate-shaped, rectangular or square component 78 comprises on one plate side a guide means 80, such as a swirler, for the medium which is formed by a recess in this plate side and from which the nozzle passage emanates conically constricted towards the orifice 40. The guide recess 80 which forms about the nozzle axis an annular passage and tangential passages oriented emanating from the latter to the nozzle passage, is located in the position 70, like the nozzle passages, fully outside of the component 5 and serves in the functioning position to deflect the medium streaming from the passage 43 transversely to the nozzle axis or to translate it into a rotational flow continuing up to orifice 40 about the nozzle axis.

Following production of the unit 5, 78 in the position 70 the component 78 is pushed into the mount 79 in which the guide means 80 eccentrically adjoins the passage 73 and the orifice 40 is oriented roughly coaxial to the through passage 81. The component 78 then forms by its outer end surface area a section of the face surface area 41 continuous throughout and is defined by its two surface areas facing away from each other, oriented transversely to the nozzle axis by adjoining the corresponding counter surface areas of the mount 79 to be a snug or press fit with respect to the component 5 in the direction of flow as well as in all other directions. When shifted into the functioning position the connection 75 is separated by fracture, as a result of which a two or multi-part nozzle arrangement can be defined in integral production of all associated components and without assembly work after removal from the production mold. The component 78 may also be produced separately from component 5, however, and then assembled thereto.

All properties and effects may be provided precisely or merely roughly or substantially as explained or may also depart greatly therefrom, depending on which effects are desired. Furthermore, each component, each unit and each spatial arrangement may be provided only once or two times or several times as well as separately or integrated. Also two or more discharge devices of the same or different kind may be composed as shown in FIGS. 1 to 11 into a single device unit for a single reservoir 60 or several such separately, since all features can be achieved for all embodiments.

I claim:

1. A dispenser for releasing media comprising:

first and second dispenser units (2, 3) including remote first and second actuating handles (60, 41) movable with respect to each other for actuating discharge of the media with a single user's hand;

at least one tension member (30) defining cross-sections (50) with cross-sectional flanks (49, 51, 52), said tension member including a spring (30);

wherein at least one of said dispenser units (2, 3) includes a valve (13, 23), said valve including a valve body (14, 24) displaceable from a closed position to an open position, an abutment member (15, 68, 69) being provided for abutting said valve body (14, 24) when in said open position, said abutment member being made in one part with said spring (30); and wherein said dispenser further includes an actuating stem (26) operationally connected with said second actuating handle (41) for common displacement, wherein said abutment member (45) is made in one part with said actuating stem (26).

2. A dispenser for releasing media comprising:

first and second dispenser units (2, 3) including remote first and second actuating handles (60, 41) movable with respect to each other for actuating discharge of the media with a single user's hand;

at least one tension member (30) defining cross-sections (50) with cross-sectional flanks (49, 51, 52), said tension member including a spring (30); and wherein said spring is located substantially permanently between said first and said second actuating handle (41).

3. A dispenser for releasing media comprising:

first and second dispenser units (2, 3) including remote first and second actuating handles (60, 41) movable with respect to each other for actuating discharge of the media with a single user's hand;

at least one tension member (30) defining cross-sections (50) with cross-sectional flanks (49, 51, 52), said tension member including a spring (30); and wherein said spring (30) includes helical spring windings including axially juxtaposed spring windings commonly made in one part, said juxtaposed spring windings operationally interengaging axially and circumferentially.

4. The dispenser according to claim 3 and defining an intial rest position, where said juxtaposed windings interengage while said dispenser (1) is in said initial rest position.

5. The dispenser according to claim 3, wherein in an axial view said spring (30) is spiral, said juxtaposed spring windings being circumferentially out of contact with each other.

6. A dispenser for releasing media comprising:

first and second dispenser units (2, 3) including remote first and second actuating handles (60, 41) movable with respect to each other for actuating discharge of the media with a single user's hand;

at least one tension member (30) defining cross-sections (50) with cross-sectional flanks (49, 51, 52);

wherein said dispenser further includes an actuating head (38), an actuating shaft (21, 26, 36, 42), a piston unit (20) with a pump piston (19), a valve seat and a cylinder casing (6), and wherein said actuating head (38), said actuating shaft (21,26, 36, 42), said pump piston (19) and said valve seat are commonly made in one part, said cylinder casing (6) and said tension member (30) being commonly made in one part, said actuating head (38) including said second actuating handle (41); and wherein axially spaced for said pump piston (19), a casing closure (29) is provided on said actuating shaft (26) for closing said cylinder casing (6), said actuating head (38) substantially permanently internally receiving said cylinder casing (6), said tension member (30) being provided for reciprocating said second dispenser unit (3) with respect to said first dispenser unit (2).

7. A dispenser for releasing media comprising:

first and second dispenser units (2, 30) including remote first and second actuating handles (60, 41) movable with respect to each other for actuating discharge of the media;

at least one tension member (30) defining cross-sections (50) with cross-sectional flanks (49, 51, 52); and an actuating head (38), an actuating shaft (26, 34), a discharge duct (43) and a discharge outlet (40) both traversing said actuating head (38), wherein from said actuating shaft (26, 34) up to said discharge outlet (40) said discharge duct (43) is exclusively bounded in one part by a duct boundary, atomizing means being provided for atomizing the media when severing from said dispenser at said discharge outlet (40), said atomizing means including a nozzle core (78) and juxtaposed depressions (80) of said duct boundary, said actuating head (38) including an external head jacket (39) and a head shaft (42) circumferentially spacedly located within said head jacket (39), said actuating head (38) including an end wall (44) connecting in one part to said head jacket (39) and said head shaft (42), said end wall (44) including said second actuating handle (41) and being traversed by said discharge duct (43), said head shaft (42) directly connecting to said actuating shaft (26, 34), said nozzle core (78) being inserted into said actuating head (38) substantially parallel to said head shaft (42) and being traversed by said discharge outlet (40).

8. A dispenser for releasing media comprising:

first and second dispenser units (2, 3) including remote first and second actuating handles (60, 41) movable with respect to each other for actuating discharge of the media;

at least one tension member (30) defining cross-sections (50) with cross-sectional flanks (49, 51, 52), said at least one tension member (30) being permanently pretensioned, wherein said tension member (30) at least superficially includes plastic material; and further including first and second operating members (4, 14; 5, 24; 5, 78) commonly made in one part, wherein means are provided for separating said first and second operating members and for transferring said second operating member (14, 25, 78) within said first operating member (4, 5) from a casting position (70) to an operating position (71), said first operating member (4, 5) including a transfer duct for guiding said second operating member (14, 24 5, 78) when transferred from said casting position (70) to said operating position (71), a holding seat (68, 79) being provided for holding said second operating member (14, 24, 78) in said operating position.

9. The dispenser according to claim 8, wherein while discharging the media both said first and second operating members (4, 14; 5, 24; 5, 78) directly contact the medium.

10. The dispenser according to claim 8, wherein a casting connection (74) is provided for connecting said first operating member (4,5) in one part with said second operating member (14, 24, 78) when in said casting position (70), said holding seat including holding faces separate from said casting connection (74), said holding faces positionally adjusting said second operating member (14, 24, 78) with respect to said first operating member (4, 5), said casting connection (74) including connecting member (76) including at least one fracture point for severing said casting connection (74), and a pivot for pivoting said second operating member with respect to said first operating member.

11. The dispenser according to claim 8, wherein said second operating member (14, 24) is a control member for controlling flow of the media, said holding seat (68) permitting control motions of said control member when in said operating position.

12. The dispenser according to claim 8, wherein when in said operating position said second operating member (78) is rigidly connected to said first operating member (5), said transfer duct including a slide (79) for slidingly receiving said second operating member (78), said second operating member including a boundary of a media duct.

13. The dispenser according to claim 8, wherein said second operating member is a nozzle body (78) including an atomizing nozzle.

14. A dispenser for releasing media comprising:

first and second dispenser units (2, 3) including remote first and second actuating handles (60, 41) movable with respect to each other for actuating discharge of the media;

at least one tension member (30) defining cross-sections (50) with cross-sectional flanks (49, 51, 52), said at least one tension member (30) being permanently pretensioned, wherein said tension member (30) at least superficially includes plastic material; and first and second operating members (4, 14; 5, 24; 5, 78), wherein means are provided for commonly injection molding said first and second operating members in a casting state and for severing said first and second operating members while supported in said molding means, transfer means being provided for transferring said second operating member (14, 24, 78) into a permanent operating state different from said casting state (70), said second operating member (14, 24, 78) being located at least partly inside said first operating member (4, 5) in at least one of said casting state, and said operating state.

15. A dispenser for releasing media comprising:

first and second dispenser units (2, 3) including remote first and second actuating handles (60, 41) movable with respect to each other for actuating discharge of the media, and first and second operating members (4, 14; 5, 24, 78); 5, 78) commonly made in one part, wherein means are provided for separating said first and second operating members and for transferring said second operating member (14, 24, 78) within said first operating member (4, 5) from a casting position (70) to an operating position (71), said first operating member (4, 5) including a transfer duct for guiding said second operating member (14, 24 5, 78) when transferred from said casting position (70) to said operating position (71), a holding seat (68, 79) being provided for holding said second operating member (14, 24 5, 78) in said operating position.

16. A dispenser for releasing media comprising:

first and second dispenser units (2, 3) including remote first and second actuating handles (60, 41) movable with respect to each other for actuating discharge of the media, and first and second operating members (4, 14; 5, 24; 5, 78), wherein means are provided for commonly injection molding said first and second operating members in a casting state and for severing said first and second operating members while supported in said molding means, transfer means being provided for transferring said second operating member (14, 24, 78) into a permanent operating state different from said casting state (70), said second operating member (14, 24, 78) being located at least partly inside said first operating member (4, 5) in at least one of said casting state, and said operating state.

* * * * *